US008713059B2

(12) United States Patent
Landais

(10) Patent No.: US 8,713,059 B2
(45) Date of Patent: Apr. 29, 2014

(54) MANAGEMENT OF COMPUTER-FILE SHARING BETWEEN AT LEAST TWO DEVICES

(75) Inventor: Gilbert Landais, Servon sur Vilaine (FR)

(73) Assignee: Orange, Paris (FR)

( * ) Notice: Subject to any disclaimer, the term of this patent is extended or adjusted under 35 U.S.C. 154(b) by 6 days.

(21) Appl. No.: 13/639,262

(22) PCT Filed: Mar. 22, 2011

(86) PCT No.: PCT/FR2011/050607
§ 371 (c)(1),
(2), (4) Date: Oct. 4, 2012

(87) PCT Pub. No.: WO2011/124804
PCT Pub. Date: Oct. 13, 2011

(65) Prior Publication Data
US 2013/0041918 A1    Feb. 14, 2013

(30) Foreign Application Priority Data
Apr. 8, 2010    (FR) ...................................... 10 52659

(51) Int. Cl.
*G06F 17/30*    (2006.01)
(52) U.S. Cl.
USPC ............ 707/791; 707/802; 707/822; 707/828
(58) Field of Classification Search
USPC ................................................. 707/600–899
See application file for complete search history.

(56) References Cited

U.S. PATENT DOCUMENTS

2005/0027743 A1*    2/2005    O'Neil et al. ............... 707/104.1
2010/0030739 A1      2/2010    Lanjewar et al.

OTHER PUBLICATIONS

Anderson, "Managing Program Binaries in a Heterogeneous UNIX Network," USENIX Association Proc. of the 5th Large Installation Systems Administration Conference USENIX Assos., Berkeley, CA, USA, retrieved from Internet website: http://homepages.inf.ed.ac.uk/dcspaul/publications/LISA5_Paper.pdf, pp. 1-9 (Sep. 30, 1991-Oct. 3, 1991).
Kim et al., "Safety, Visibility, and Performance in a Wide-Area File System," Proceedings of Fast. Conference on File and Storage Technologies, USENIX, US, pp. 131-144 (Jan. 1, 2002).
Saito et al., "Taming aggressive replication in the Pangaea wide-area file system," Proceedings of the Fifth Symposium on Operating Systems Design and Implementation, Oct. 23-25, 2000, San Diego, CA, USENIX Association, US, pp. 15-30 (Dec. 9, 2002).

* cited by examiner

*Primary Examiner* — Isaac M Woo
(74) *Attorney, Agent, or Firm* — Drinker Biddle & Reath LLP

(57) ABSTRACT

A method for managing computer files in a first device storing the files according to a first file tree, comprising the following steps: for a current level of the first file tree, receiving data representing a level of the same rank of a second data structure representing a second file tree of a second device communicating with the first device; comparing the current level with the level of the same rank of the second file tree, in order to determine the presence in the second file tree, at the rank level of the current level, of an element that is not found in the first file tree at the current level; and, in the event that an element of the second file tree is not found in the first file tree, adding a descriptor of said element to the first file tree at the current level, wherein the descriptor enables access to said element from the first file tree.

13 Claims, 5 Drawing Sheets

MANAGEMENT OF COMPUTER-FILE SHARING BETWEEN AT LEAST TWO DEVICES

CROSS-REFERENCE TO RELATED APPLICATIONS

This application is the U.S. national phase of the International Patent Application No. PCT/FR2011/050607 filed Mar. 22, 2011, which claims the benefit of French Application No. 1052659 filed Apr. 8, 2010, the entire content of which is incorporated herein by reference.

FIELD

The invention relates to the field of computer file storage management on multiple interconnected storage devices. It more particularly relates to the management of these files in a context of sharing them to enable access from any of these devices to the files stored on the devices.

BACKGROUND

With the proliferation of home devices able to store computer files, users of these devices are encountering difficulties in managing all the stored files.

Today it is common to have one or more personal computers, a storage device that streams media over a distribution network ("Set Top Box"), or other devices. The user then has an assortment of files distributed across different equipments.

To access the files stored on a specific device, the user must adapt to the file system of the device. Even when the devices are networked to allow using one device to access a file stored on another device, the user must adapt to the specific organization of the files on each device.

As a result, it is difficult for the user to keep a simple and consistent view of all the computer files (text, audio, video, images, etc.) on the assorted devices the user has.

A need therefore exists for a management of computer files stored on different communicating devices that is both effective and transparent to the user.

SUMMARY

The present invention aims to improve the management of files on these devices.

For this purpose, a first aspect of the invention proposes a method for managing computer files in a first device able to store computer files and able to be connected with at least a second device in order to exchange at least computer files, said first device storing the files according to a first data structure representing a first file tree enabling access to files stored in memory of the first device, the children of the root of the first tree corresponding to a first level of the tree, the children of the first level nodes corresponding to a second level of the tree, and so on, said method comprising the following steps:
for a current level of the first tree, receiving data representative of a level of the same rank in a second data structure representing a second file tree enabling access to files stored in the second device, the children of the root of the second tree corresponding to a first level of the tree, the children of the first level nodes corresponding to a second level of the tree, and so on,
comparing the current level with the level of the same rank, in the second structure, represented by the data received, in order to determine the presence in the second tree, at the rank level of the current level, of an element that is not found in the first tree at the current level, and
if an element of the second tree is not found in the first tree, incorporating a descriptor for this element into the first tree data structure at the current level, said descriptor enabling access to said element from the first tree.

An element of the tree corresponds, for example, to a file or a folder (or sub-folder).

A descriptor may additionally contain one or more pieces of information such as the name, type, or size of the stored item.

The descriptor is incorporated, for example, by adding a leaf to the first tree.

It is also possible to add a node, in order to describe a folder for example.

In the first aspect of the invention, a unique document space is created for the user of the first device, enabling access to the elements present in both the first and second devices. When the method is implemented in every device the user has (or group of users, such as a family), the same view of the document space (or portion of the document space) is obtained on each device, meaning the same tree (or sub-tree) of folders and the same content files.

The method of the invention simplifies the actions the user must perform to access files stored on different devices. In effect, the user is given a single consistent view of all his/her files and folders, with transparent file sharing and optimal management (changes or saves for example).

For example, the comparison of levels is done element by element, using at least one from among the name, size, or content of the element.

The content of an element corresponds, for example, to the binary content of a file.

In some embodiments, during the comparison of levels, it is also determined whether a first element of the first tree and a second element of the second tree are identical according to a first comparison criterion, and in this case the following steps are applied:
comparing the first and second elements using a second criterion to determine whether the first and second elements are different according to the second criterion, and
if the first and second elements are different according to the second criterion, incorporating a descriptor for the second element into the first tree data structure at the current level, said descriptor enabling access to said second element from the first tree.

A low-level verification of the presence of two identical elements within the first and second devices can therefore be performed. For example, the first criterion may correspond to comparing the names of the elements, and the second criterion may correspond to comparing the size or the content of the elements.

In some embodiments, during the comparison of levels, it is also determined whether a third element of the first tree and a fourth element of the second tree are identical according to a third comparison criterion, and in this case the following steps are applied:
accessing the content of the third element,
sending a request to the second device to obtain data representative of the content of the fourth element,
comparing the content of third and fourth elements to determine whether the two elements differ in content, and
if the third and fourth elements differ in content, incorporating a descriptor for the fourth element into the first tree data structure at the current level, said descriptor enabling access to said fourth element from the first tree.

This reduces the amount of data initially sent to describe the level of the second tree. Additional data are only received if there is a need to discriminate between two identical elements using the third criterion.

It may additionally be arranged so that the first and second trees are respectively associated with a first piece of version information and a second piece of version information respectively representing a change in state over time of the first and second trees, the method then additionally comprises the steps of:

sending a request to the second device in order to receive data representative of the second piece of version information, comparing the first and second pieces of version information to determine whether the version of the first tree is earlier than the version of the second tree, and if the version of the first tree is earlier than the version of the second tree, sending a request to obtain the data representative of the level in the second data structure of the same rank as the current level in the first tree.

In this manner, each device knows how up to date its information concerning the elements present in the other devices is.

For example, if the first device is disconnected from the second device followed by a reconnection, the first device can use the version information to find out whether the second tree has changed and whether a new comparison of trees is required in order to update the first tree.

The method may additionally comprise the steps of:

comparing the current level with the level of the same rank, in the second structure, represented by the data received, in order to determine the presence in the first tree, at the rank level of the current level, of a descriptor for an element of the second tree, this element no longer being present in the second tree at the current level in the second version, and if the element is no longer present in the second tree, deleting the descriptor for this element from the first tree data structure at the current level.

It is thus possible to keep the first tree consistent with changes made in the elements of the second tree.

In some embodiments, the elements of the first and second trees are associated with a third piece of version information representing the version of the tree to which they belong which was the current version when they were last modified; the comparison of the current level with the level of the second structure represented by the data received is made by comparing the third pieces of information associated with the elements.

This simplifies and accelerates the comparison of the trees. The comparison criterion enables rapid comparison and allows processing only those elements that have a later version than the version of the first tree.

In order to keep the trees of a set of devices synchronized, it can be arranged so that, when a file is updated on the first device, the first piece of version information is updated and then sent out to the other devices in a version modification notification message.

For example, the request to the second device to receive data representative of the second piece of version information is sent after a message is received from the second device indicating a change of version for the second tree.

In order to access an element of the second device from a descriptor in the first tree, the first device may additionally:

send a query to at least one other device to ask whether the element is present on said at least one other device, and if the element is present on a device, the first device obtains a copy of the element in order to store it in the first device.

In this manner, file copies can be made to synchronize the content of the first and second trees.

Other aspects of the invention provide for:

a computer program containing instructions for implementing a method according to the first aspect of the invention when the program is executed by a processor;

a computer-readable medium on which such a computer program is stored;

a device configured to implement the method according to the first aspect of the invention; and a system comprising devices for implementing a method according to the first aspect of the invention.

Such a system comprises:

a first device able to store computer files and exchange them with at least a second device, a second device able to store computer files and exchange them with at least the first device, and the first device stores the files in a first data structure representing a first file tree enabling access to files stored in memory of the first device, the children of the root of the first tree corresponding to a first level of the tree, the children of the first level nodes corresponding to a second level of the tree, and so on, and for a current level of the first tree: the first device receives data representative of a level of the same rank in a second data structure representing a second file tree enabling access to files stored in the second device, the children of the root of the second tree corresponding to a first level of the tree, the children of the first level nodes corresponding to a second level of the tree, and so on; the first device compares the current level with the level of the same rank, in the second structure, represented by the data received, in order to determine the presence in the second tree, at the rank level of the current level, of an element which is not found in the first tree at the current level; and if an element of the second tree is not found in the first tree, the first device incorporates a descriptor for this element into the first tree data structure at the current level, said descriptor enabling access to said element from the first tree.

For example, the devices comprise:

a communication unit for sending and receiving messages in order to exchange computer files with at least a second device, a storage unit for storing computer files, and a processing unit for managing computer files according to a first data structure representing a first file tree enabling access to files stored in the storage unit, the children of the root of the first tree corresponding to a first level of the tree, the children of the first level nodes corresponding to a second level of the tree, and so on, said processing unit being configured, for a current level of the first tree, to: receive data representative of a level of the same rank in a second data structure representing a second file tree enabling access to files stored in the second device, the children of the root of the second tree corresponding to a first level of the tree, the children of the first level nodes corresponding to a second level of the tree, and so on; compare the current level with the level of the same rank, in the second structure, represented by the data received, in order to determine the presence in the second tree, at the rank level of the current level, of an element which is not found in the first tree at the current level; and if an element of the second tree is not found in the first tree, incorporate a descriptor for this element into the first tree data structure at the current level, said descriptor enabling access to said element from the first tree.

The advantages provided by the computer program, the computer-readable medium, the device, and the system, as briefly described above, are at least identical to those mentioned further above in relation to the method according to the first aspect.

BRIEF DESCRIPTION OF THE DRAWINGS

Other features and advantages of the invention will be further apparent from reading the following description. This description is purely illustrative and is to be read with reference to the attached drawings, in which.

DETAILED DESCRIPTION

Figure 1:
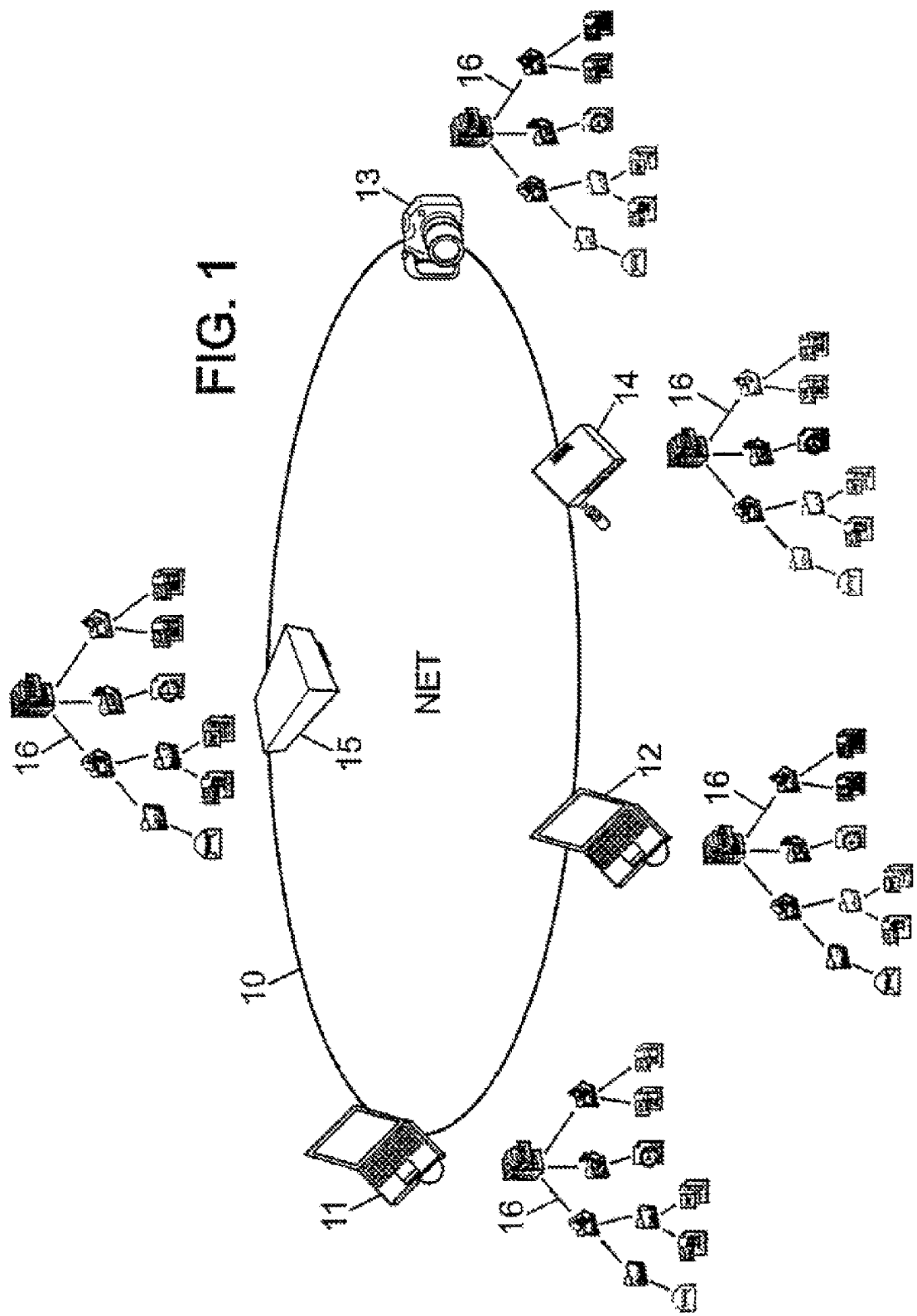
FIG. 1 illustrates a general context for the implementation of some embodiments of the invention.

FIG. 1 illustrates a general context for implementing some embodiments of the invention. In this context, a set of devices able to store and exchange computer files are connected to each other, for example via a network 10. In another context (not represented), the devices could be directly connected to each other. The set of devices includes, for example, two PC-type personal computers 11 and 12, a digital camera 13, a set top box 14, and a NAS (Network Attached Storage) file storage device 15.

Each device can store computer files such as text, audio, image, video, or other files. In addition, the devices interconnected by the network 10 can exchange files.

For example, computer 11 can send a file stored on its drive to computer 12 so that the latter can store it on its own drive.

We propose offering the user a unified view of a file tree 16 grouping all the files stored on the interconnected devices, and doing so from any device.

Each device displays a tree which shows files and folders, independently of whether it actually has stored locally all the files and folders shown in the tree. In order to indicate that a file or folder of the tree is not stored locally on a device, this file or folder may, for example, be displayed in gray.

Thus, whether the user is looking at files on the computer 11 or on the set top box 14 (or other device), the user can find a file stored on any of the devices. The user can find a file in the tree, regardless of its actual storage location and regardless of the device from which the user wishes to access it.

Figure 2:
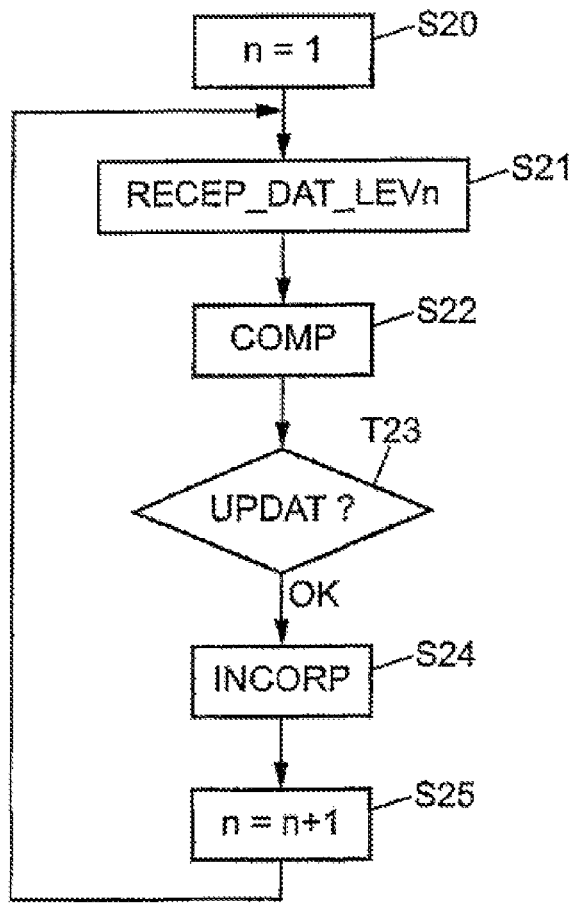
FIG. 2 is a general flow chart representing the steps followed to update a common file tree according to one embodiment.
Figure 3A:
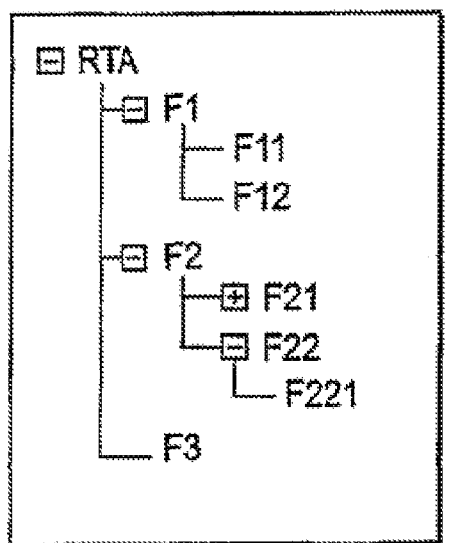
FIGS. 3a and 3b illustrate two file trees and the result of updating a tree with information from the other tree according to one embodiment.
Figure 3A:
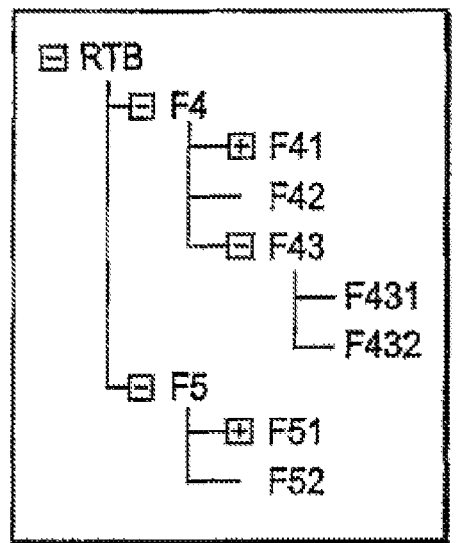
Figure 3B:
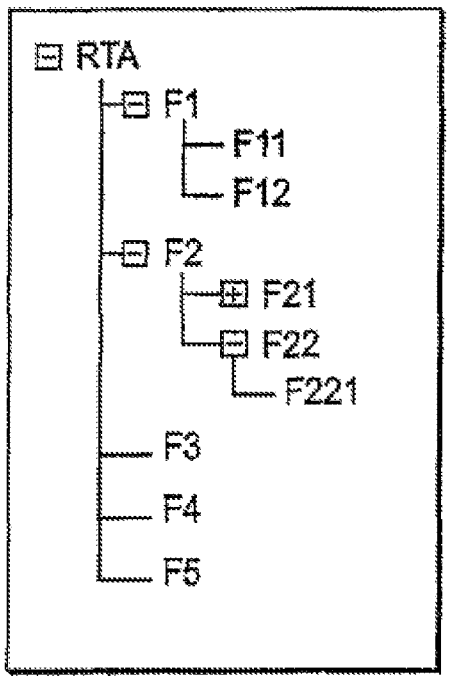

Updating the tree on each device is described below, with reference to FIGS. 2, 3a and 3b. FIG. 2 is a general flowchart representing the steps applied to update the tree, and FIGS. 3a and 3b illustrate updating the tree of a device with data representing another tree of a second device.

The tree creation method can be carried out by any of the interconnected devices 11, 12, 13, 14, and 15.

The device carrying out the method, for example device 11, has a data structure representing a tree 30. This tree has a root RTA from which all the files and folders are accessible in the device. From the root RTA, it is possible to access folder F1, folder F2, and file F3 as represented in FIG. 3. Folder F1 contains a file F11 and a folder F12. Folder F2 contains folder F21, which itself contains other folders and files (not represented), and folder F22 containing file F221.

During a first initialization step S20, device 11 visits the first level in the tree RTA, meaning the level of the direct children of the root, which in this case is folders F1 and F2, and file F3. The goal is to compare this first level with the first level of the tree 31 of another device with which it is sharing files, for example device 12.

Tree 31 represents the files available in device 12. This tree contains a root RTB from which it is possible to access two folders F4 and F5. Folder F4 contains folder F41 which in turn contains folders and files (not represented), file F42, and another folder F43 containing two files F431 and F432. Folder F5 contains folder F51 which in turn contains files and folders (not represented), and file F52.

During step S21, device 12 receives data representative of the level in tree 31 of the same rank as the current level in tree 30. For example, if device 11 is at the rank level N in tree 30, it receives the representative data for rank level N in tree 31. The device receives, for example, a list of elements (files, folders, and sub-folders), with attributes such as the size, file type, or others.

The data may be received after a message is sent to device 11 to that effect, or after a synchronization of the tree 30 as described below.

Device 11 then performs the comparison of levels of the same rank during step S22. For example, device 11 performs an element by element comparison of the name, size, or content of the elements. This comparison aims to determine the presence of elements in that level of tree 31 that are not present in that level of tree 30.

For example, device 11 begins by verifying, in the first level of tree 30, whether a folder exists named "F4", then whether a folder exists named "F5".

During step T23, it is then decided whether tree 30 is to be updated.

In a first example, it is assumed that elements F4 and F5 do not have the same name as elements F1, F2, and F3. Tree 30 is then modified during step S24 by incorporating into the current level a descriptor for elements F4 and F5 which enables accessing these elements on the second device 12. The new tree 30 obtained in this manner is illustrated in FIG. 3b. This descriptor contains a name to designate the element, a storage indicator (for example an identification of the device storing it), a backup mode, a version number (as described below), or some other information.

In a second example, it is assumed that element F4 has the same name as element F1. A new comparison is then performed according to another known criterion, such as, for example, the size of these elements. Based on the result of this second comparison, if the elements are of different sizes, it is decided to add a descriptor for element F4. If such a descriptor is added, it may for example bear a different name than the name of element F1, to avoid confusing them.

In a third example, it is assumed that element F4 has the same name as element F1. It is then attempted to determine whether these elements differ in content, and therefore a second level of tree 30 is accessed, which contains elements F11 and F12 as children of element F1 of the first level. At the request of device 11, data is then obtained from device 12, describing elements F41, F42, F43 of the corresponding level in tree 31. Next a comparison of the content of elements F1 and F4 is made and it is decided whether or not to incorporate a descriptor for element F4 in tree 30.

Once the elements of the current level of the tree 31 are incorporated, the device advances to the next level during step S25.

The number of levels to be visited can be adjusted according to how deep the tree 30 is to be modified. The greater the desired modification depth in the tree, the more levels are visited.

Alternatively, it may be decided to visit a level only if a user of the second device has accessed this level.

Also alternatively, the different levels of the tree may be accessed according to automatic updates.

With a tree updated in this manner, a user can use any device to access the files stored on another device.

Figure 4:
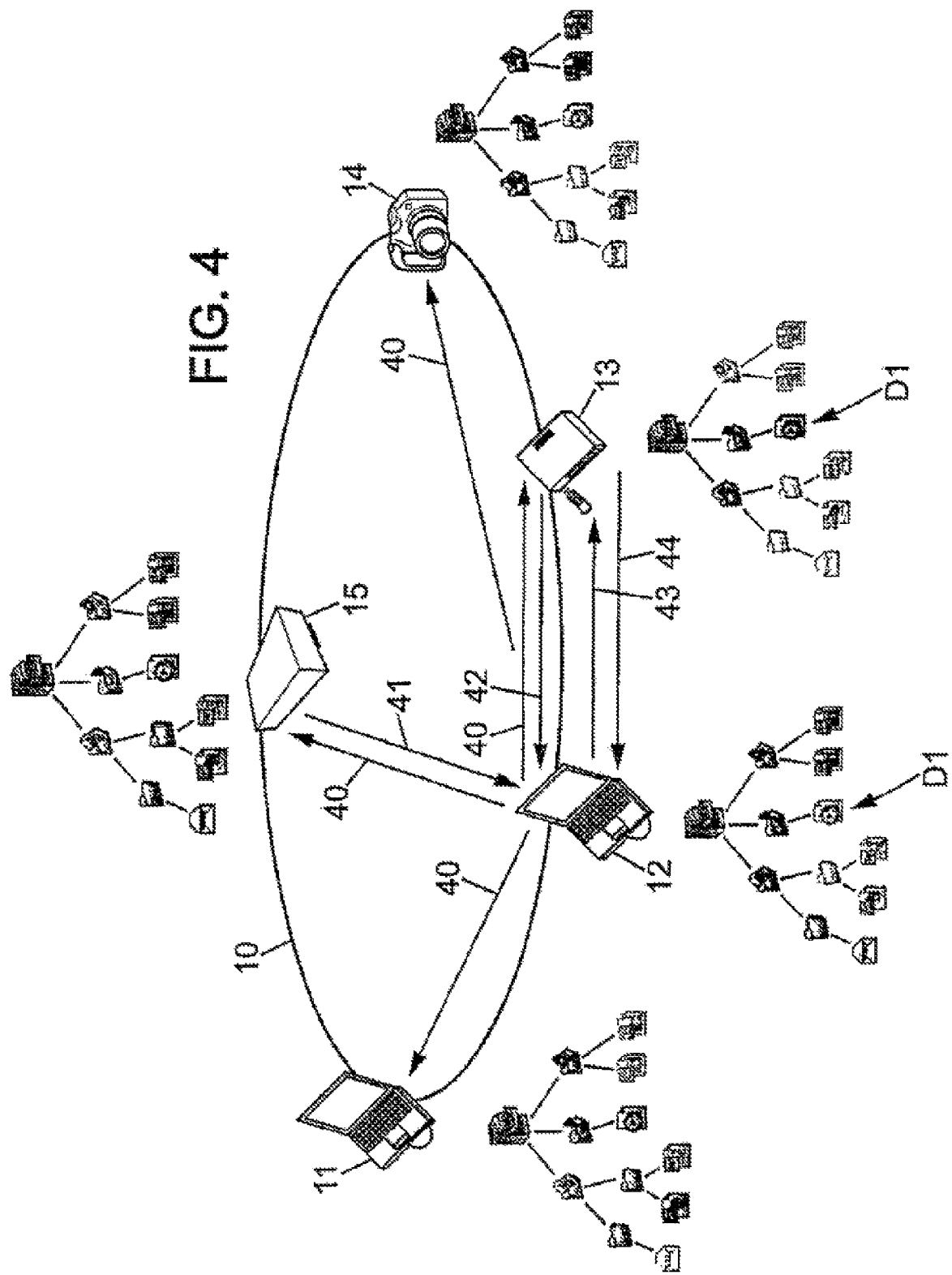
FIG. 4 illustrates accessing an element, in a tree of a device according to one embodiment, corresponding to a file or a folder which is not found locally.

As illustrated in FIG. 4, when accessing an element in a device tree that corresponds to a file or a folder that is not present locally, the device can send requests to other devices in order to copy the file or folder locally for subsequent access.

In this example, device 12 wants to access file D1 which is not stored on device 12. Device 12 sends requests 40 to all the devices 11, 13, 14, and 15 in order to poll them to find out whether they have this file stored.

In this example, device 15 sends a response message 41 saying that it does not have the file, devices 11 and 14 do not answer, and device 13 sends a message indicating that it has the file.

The device then sends a message 43 to device 13 to obtain a copy of file D1. Device 13 then sends a message 44 containing the data of file D1.

If several devices can provide D1, a choice can be made on where to send the message 43 according to the transfer speed or some other criterion.

Once file D1 has been copied locally, it can be opened on device 12.

After each device has updated its own tree to show the elements present on the other devices, mechanisms for updating and synchronizing these trees as a function of events on the network of these devices can additionally be provided.

In order to manage such synchronization, the concept of tree versions and the elements that compose them can be introduced. For example, each tree of each device is associated with a version number.

This version information can be used for the comparison in step S22, described above. In this case, it can be decided to incorporate only the elements of tree 31 which have a later version than the version of tree 30.

When an element is saved after modification, a change notification can be sent out to the other devices so that each device of the set of interconnected devices can update its tree. In the case of a device reconnecting to the network after being disconnected for a certain period of time, a synchronization phase can allow updating its tree to reflect changes that may have occurred in the organization of the files and folders of the other devices. In addition, to incorporate changes made to files on the other devices as quickly as possible, each device may have an implemented listening mechanism (such as a loop) that watches for change notifications on the network, refresh mechanism that triggers (periodically, upon detection of predefined events, or other) a synchronization action, or some other mechanism.

Figure 5:
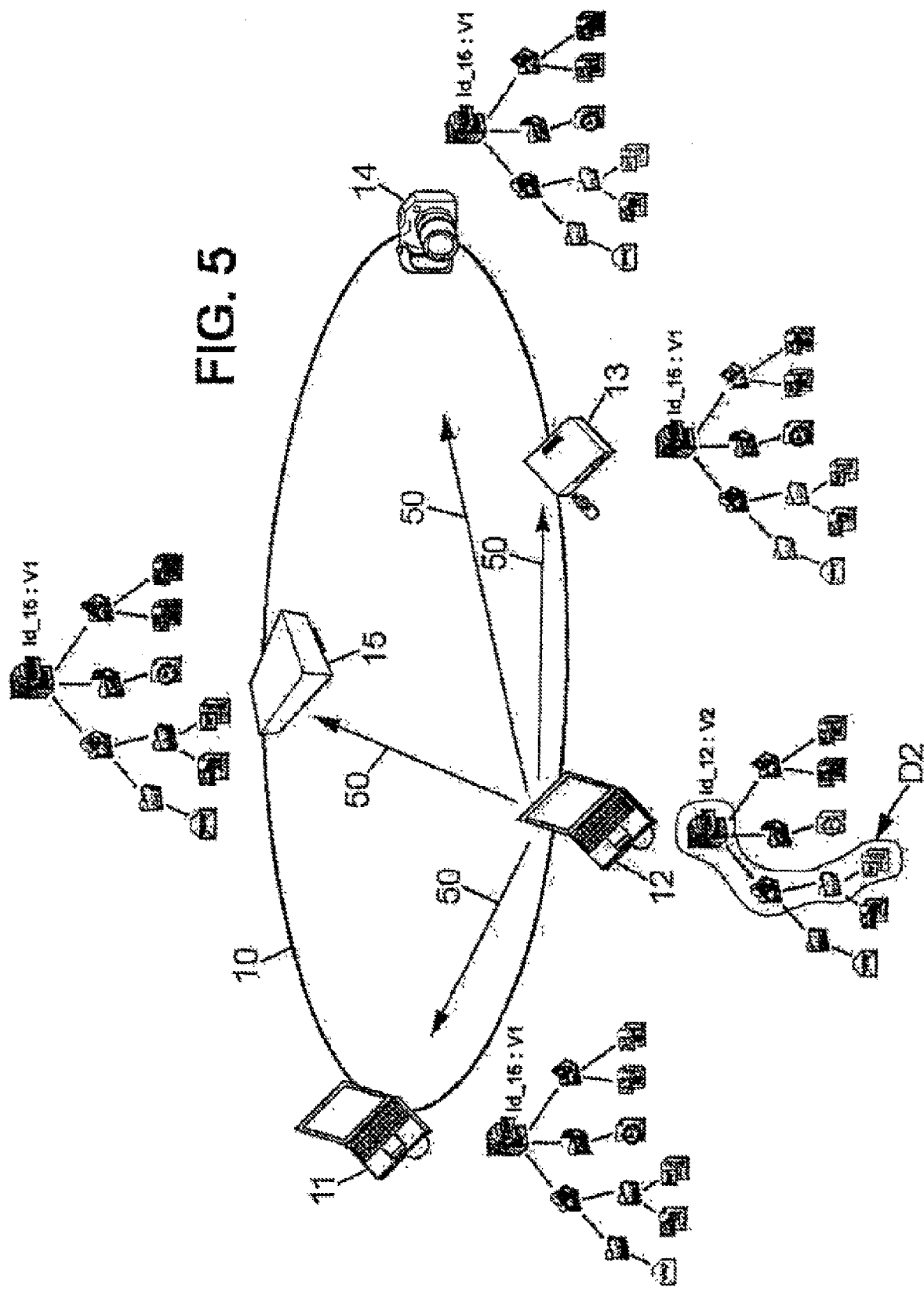
FIG. 5 illustrates a synchronization of the trees of interconnected devices according to one embodiment.

A version (or revision) number is associated with each element of a tree. On each device, a general revision number is assigned to the tree. FIG. 5 illustrates a synchronization of the trees of interconnected devices. An identifier indicating the device which created the latest revision is associated with it as well. For example, "Id_15: V1" indicates revision V1 created on device 15. In the example, after a state where all devices were in revision Id_15: V1, a change made to device 12 has caused it to advance to state Id_12: V2.

After modifying a file D2 on device 12, the user saves his/her changes. This document then has revision number Id_12: V2, which is propagated up the tree of folders to the root of the tree. This new revision number is assigned to all folders in the path to the document.

Next, device 12 broadcasts a message 50 to inform the other devices of the creation of the new revision Id_12: V2.

Synchronization is then performed between device 12 and the other devices, so that the other devices can update their tree to reflect the change made to file D2.

The same type of synchronization can be performed for the creation or deletion of a file or folder.

As an alternative to broadcasting the message 50, each device, for example device 15, could periodically send a request to the other devices to receive the version number of their current tree. Then, upon receipt of the version number for the other devices, device 15 compares these version numbers to the version of its current tree. If the device determines that its tree has an earlier version than the tree version of a device which has returned its version number, it begins updating its tree as described above. In the example shown in FIG. 5, device 15 determines that version V1 of its tree is older than version V2 of the tree of device 12.

During the update, the device may detect that its current tree contains a descriptor for an element which in version V1 is stored on device 12 but is not present on device 12 in version V2. In this case, this descriptor is deleted to bring the tree of device 15 into agreement with that of device 12.

A computer program comprising instructions for implementing the method of the invention can be written by a person skilled in the art, according to a general algorithm deduced from the general flow chart of FIG. 2 and from the present detailed description.

Figure 6:
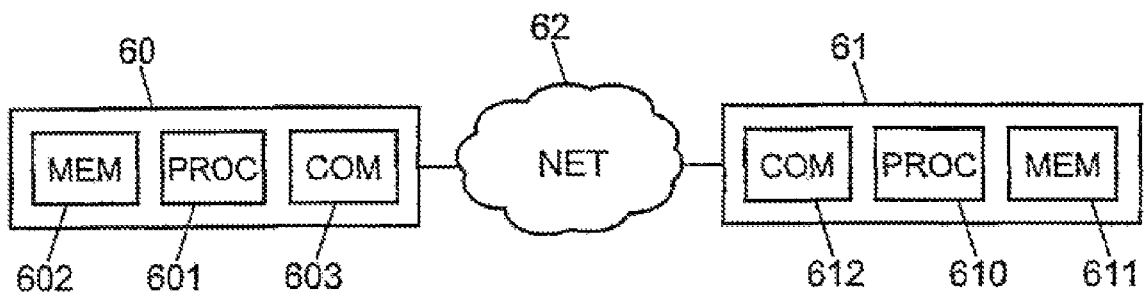
FIG. 6 schematically illustrates a system and devices according to one embodiment.

FIG. 6 schematically illustrates a system according to an embodiment of the invention. The system comprises a device 60 connected to another device 61 via a communication network 62.

Device 60 comprises a processing unit 601 for creating and/or updating a data structure representing a file tree enabling access to files stored in the storage unit 602 of the device according to a method of the invention. The storage unit 602 may contain different types of memory storage. For example, the storage unit also contains memory for storing computational data. The storage unit may also contain memory for storing a computer program according to the invention, for execution by a processor of the processing unit. The device additionally comprises a communication unit 603 for communicating in particular with device 61 via the network 62 in order to execute a method of the invention and exchange computer files. Device 61 has a structure similar to that of device 60 and comprises a processing unit 610, a memory unit 611, and a communication unit 612.

The invention is not limited to the embodiments presented. Other variants and embodiments can be deduced and implemented by a person of the art upon reading the present description and the attached drawings.

The invention claimed is:

1. A method for managing computer files in a first device able to store computer files and able to be connected with at least a second device in order to exchange at least computer files, said first device storing the files according to a first data structure representing a first file tree enabling access to files stored in memory of the first device, the children of the root of the first tree corresponding to a first level of the tree, the children of the first level nodes corresponding to a second level of the tree, and so on, said method comprising the following steps:

for a current level of the first tree, receiving data representative of a level of the same rank in a second data structure representing a second file tree enabling access to files stored in the second device, the children of the root of the second tree corresponding to a first level of the tree, the children of the first level nodes corresponding to a second level of the tree, and so on, comparing the current level with the level of the same rank, in the second structure, represented by the data received, in order to determine the presence in the second tree, at the rank level of the current level, of an element that is not found in the first tree at the current level, and if an element of the second tree is not found in the first tree, incorporating a descriptor for this element into the first tree data structure at the current level, said descriptor enabling access to said element from the first tree.

2. The method according to claim 1, wherein the comparison of levels is done element by element, using at least one from among the name, size, or content of the element.

3. The method according to claim 1, wherein during the comparison of levels, it is also determined whether a first element of the first tree and a second element of the second tree are identical according to a first comparison criterion, and in this case the following steps are applied:

comparing the first and second elements using a second criterion to determine whether the first and second elements are different according to the second criterion, and if the first and second elements are different according to the second criterion, incorporating a descriptor for the second element into the first tree data structure at the current level, said descriptor enabling access to said second element from the first tree.

4. The method according to claim 1, wherein during the comparison of levels, it is also determined whether a third element of the first tree and a fourth element of the second tree are identical according to a third comparison criterion, and in this case the following steps are applied:

accessing the content of the third element, sending a request to the second device to obtain data representative of the content of the fourth element, comparing the content of the third and fourth elements to determine whether the two elements differ in content, and if the third and fourth elements differ in content, incorporating a descriptor for the fourth element into the first tree data structure at the current level, said descriptor enabling access to said fourth element from the first tree.

5. The method according to claim 1, wherein the first and second trees are respectively associated with a first piece of version information and a second piece of version information respectively representing a change in state over time of the first and second trees, the method additionally comprising the steps of:

sending a request to the second device in order to receive data representative of the second piece of version information, comparing the first and second pieces of version information to determine whether the version of the first tree is earlier than the version of the second tree, and if the version of the first tree is earlier than the version of the second tree, sending a request to obtain data representative of the level in the second data structure of the same rank as the current level in the first tree.

6. The method according to claim 5, additionally comprising the steps of:

comparing the current level with the level of the same rank, in the second structure, represented by the data received, in order to determine the presence in the first tree, at the rank level of the current level, of a descriptor for an element of the second tree, this element no longer being present in the second tree at the current level in the second version, and if the element is no longer present in the second tree, deleting the descriptor for this element from the first tree data structure at the current level.

7. The method according to claim 5, wherein the elements of the first and second trees are associated with a third piece of version information representing the version of the tree to which they belong which was the current version when they were last modified, and wherein the comparison of the current level with the level of the second structure represented by the data received is made by comparing the third pieces of information associated with the elements.

8. The method according to claim 5, wherein when a file is updated on the first device, the first piece of version information is updated and then sent out to the other devices in a version modification notification message.

9. The method according to claim 5, wherein the request to the second device to receive data representative of the second piece of version information is sent after a message is received from the second device indicating a change of version for the second tree.

10. The method according to claim 1, wherein, in order to access an element of the second device from a descriptor in the first tree, the first device:

sends a query to at least one other device to ask whether the element is present on said at least one other device, and if the element is present on a device, the first device obtains a copy of the element in order to store it in the first device.

11. A non-transitory computer program product comprising instructions for implementing the method according to claim 1, when it is executed by a processor.

12. A device comprising:

a communication unit for sending and receiving messages in order to exchange at least computer files with at least a second device, a storage unit for storing computer files, and a processing unit for managing computer files according to a first data structure representing a first file tree enabling access to files stored in the storage unit, the children of the root of the first tree corresponding to a first level of the tree, the children of the first level nodes corresponding to a second level of the tree, and so on, said processing unit being configured, for a current level of the first tree, to: receive data representative of a level of the same rank in a second data structure representing a second file tree enabling access to files stored in the second device, the children of the root of the second tree corresponding to a first level of the tree, the children of the first level nodes corresponding to a second level of the tree, and so on; compare the current level with the level of the same rank, in the second structure, represented by the data received, in order to determine the presence in the second tree, at the rank level of the current level, of an element which is not found in the first tree at the current level; and if an element of the second tree is not found in the first tree, incorporate a descriptor for this element into the first tree data structure at the current level, said descriptor enabling access to said element from the first tree.

13. A system comprising:
a first device able to store computer files and exchange them with at least a second device,
a second device able to store computer files and exchange them with at least the first device, and
wherein the first device stores the files in a first data structure representing a first file tree enabling access to files stored in memory of the first device, the children of the root of the first tree corresponding to a first level of the tree, the children of the first level nodes corresponding to a second level of the tree, and so on, and
wherein, for a current level of the first tree: the first device receives data representative of a level of the same rank in a second data structure representing a second file tree enabling access to files stored in the second device, the children of the root of the second tree corresponding to a first level of the tree, the children of the first level nodes corresponding to a second level of the tree, and so on; said first device compares the current level with the level of the same rank, in the second structure, represented by the data received, in order to determine the presence in the second tree, at the rank level of the current level, of an element which is not found in the first tree at the current level; and if an element of the second tree is not found in the first tree, the first device incorporates a descriptor for this element into the first tree data structure at the current level, said descriptor enabling access to said element from the first tree.

\* \* \* \* \*